(12) United States Patent
Khan

(10) Patent No.: US 6,801,966 B1
(45) Date of Patent: Oct. 5, 2004

(54) COMBINED SERIAL AND INFRARED PORT FOR CONSUMER ELECTRONIC DEVICES

(75) Inventor: Zafar Khan, Chelmsford, MA (US)

(73) Assignee: Index Systems, Inc., Tortola (VG)

( * ) Notice: Subject to any disclaimer, the term of this patent is extended or adjusted under 35 U.S.C. 154(b) by 310 days.

(21) Appl. No.: 09/611,363

(22) Filed: Jul. 6, 2000

Related U.S. Application Data

(60) Provisional application No. 60/142,653, filed on Jul. 6, 1999.

(51) Int. Cl.[7] .............................................. G06F 13/12
(52) U.S. Cl. ............................. 710/62; 725/9; 455/556; 707/3; 703/27
(58) Field of Search ........................... 725/9; 455/556; 707/3; 703/27; 710/62

(56) References Cited

U.S. PATENT DOCUMENTS

| | | | |
|---|---|---|---|
| 5,787,259 A | * | 7/1998 | Haroun et al. ............... 709/253 |
| 5,812,931 A | * | 9/1998 | Yuen ........................... 725/123 |
| 5,914,746 A | | 6/1999 | Matthews, III et al. ....... 348/10 |
| 5,940,199 A | * | 8/1999 | Yoshida ....................... 398/191 |
| 5,970,248 A | * | 10/1999 | Meier ........................... 717/125 |
| 6,128,117 A | * | 10/2000 | Kim ............................. 359/152 |
| 6,292,943 B1 | * | 9/2001 | Shin et al. .................... 725/58 |
| 6,321,382 B1 | * | 11/2001 | Wugofski ..................... 725/59 |
| 6,379,246 B1 | * | 4/2002 | Dabrowski .................... 463/16 |
| 6,401,059 B1 | * | 6/2002 | Shen et al. ................... 703/27 |
| 6,408,435 B1 | * | 6/2002 | Sato ............................. 725/58 |
| 6,481,013 B1 | * | 11/2002 | Dinwiddie et al. ........... 725/80 |

FOREIGN PATENT DOCUMENTS

| | | |
|---|---|---|
| EP | 0 876 034 | 11/1998 |
| EP | 0 898 388 | 2/1999 |
| WO | Wo 96/41472 | 12/1996 |

OTHER PUBLICATIONS

International Preliminary Examination Report dated Sep. 26, 2001.

* cited by examiner

Primary Examiner—Jeffrey Gaffin
Assistant Examiner—Niketa Patel
(74) Attorney, Agent, or Firm—Fish & Neave

(57) ABSTRACT

A consumer electronic device, such as a television, cable box, or VCR uses a combined serial and infrared output port. The combined port is connected to a slave peripheral device that includes a serial port and an infrared output port. The serial port of the slave peripheral device is connected to the combined serial and infrared port and the infrared output port is connected to an infrared remote control transmitter via an infrared driver signal passthrough circuit.

12 Claims, 8 Drawing Sheets

COMBINED SERIAL AND INFRARED PORT FOR CONSUMER ELECTRONIC DEVICES

CROSS-REFERENCE TO RELATED APPLICATION

This application claims priority of U.S. Provisional Application No. 60/142,653 filed Jul. 6, 1999, which is incorporated by reference as if fully set forth herein.

FIELD OF THE INVENTION

The present invention relates generally to a link for interfacing host devices with slave devices, and more particularly to a link for interfacing host devices that store electronic program guides (EPGs) with slave devices that enhance EPG capabilities.

SUMMARY OF THE INVENTION

A consumer electronic device, such as a television, cable box, or VCR uses a combined serial and infrared output port. The combined port is connected to a slave peripheral device that includes a serial port and an infrared output port. The serial port of the slave peripheral device is connected to the combined serial and infrared port and the infrared output port is connected to an infrared remote control transmitter via an infrared driver signal passthrough circuit.

DETAILED DESCRIPTION

The Guide-link (G-Link) is a link that provides a serial interface between Host devices such as televisions (TVs) and set-top boxes (STBs), and slave devices. Hereinafter, TV/STB represents either a television and/or a set-top box (e.g. VCR). The G-Link allows the manufacturer to expand the capabilities of an EPG system by loading data and software from a slave device to a TV/STB. The G-Link is a cost-effective solution, as it shares the existing IR Mouse that is used to control televisions, cable boxes, and VCRs and uses very few gates in the hardware implementation.

The G-Link supports the following slave devices: a serial debugger device, a demonstration ROM device, a database expansion device, and a modem. These devices are not the only devices that can be supported by the G-Link. Other devices can also be supported by the G-Link as long as they follow the G-Link protocol.

The Serial Debugger Interface can assist in debugging production firmware, i.e., firmware in a TV/STB. A demonstration ROM device can download a graphical demonstration program that displays the features of an EPG and/or TV/STB. The demonstration ROM device can include customization for a retailer selling TV/STBs. A database expansion device expands the database information capacity of TV/STB beyond what is available in an EPG. A modem (or an RS-232 interface) facilitates features such as: consumer feedback, shopping, or a worldwide web link.

Figure 1:
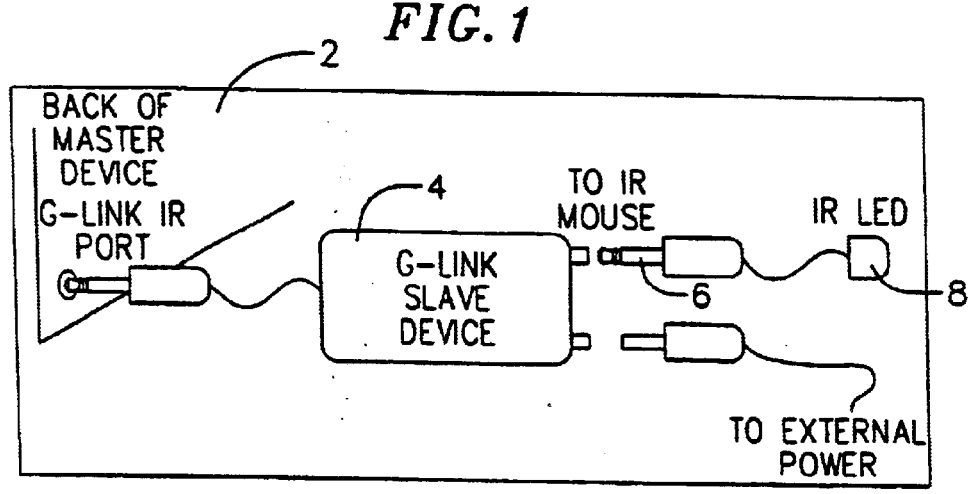
FIG. 1 is a block diagram showing a G-Link system configuration according to one embodiment of the invention.

FIG. 1 shows an example of how a television, G-Link device, and IR Mouse might be connected. The G-Link topology is a master/slave scheme where the master device 2 (that is, an EPG TV/STB) interacts with one slave (that is, external) device 4. The slave connects to the master using the same connector 6 as an external IR Mouse. Every slave device must have a connector that allows an IR Mouse connection.

The G-Link slave device, when placed into an IR output mode, either passes through the LED drive current from the G-Link connector to the IR Mouse connector or sources current from its own power supply.

Figure 2:
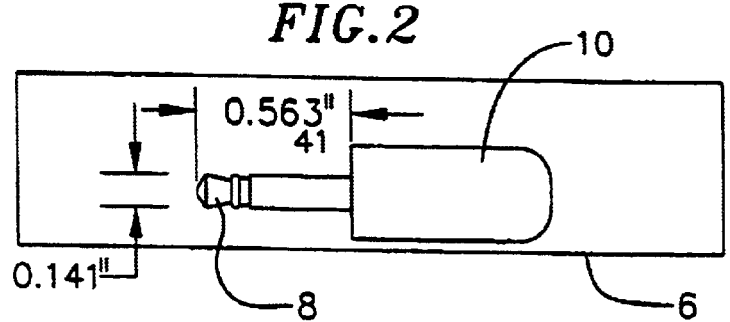
FIG. 2 is a lateral view of the G-Link connector according to an embodiment of the invention.

In the preferred embodiment of the invention, the G-Link connector 6 is a 3.5 mm (0.141 inch) mini jack, as shown in FIG. 2. The tip 8 of the G-Link connector is data and the sleeve 10 of the G-link connector is ground.

Figure 3:
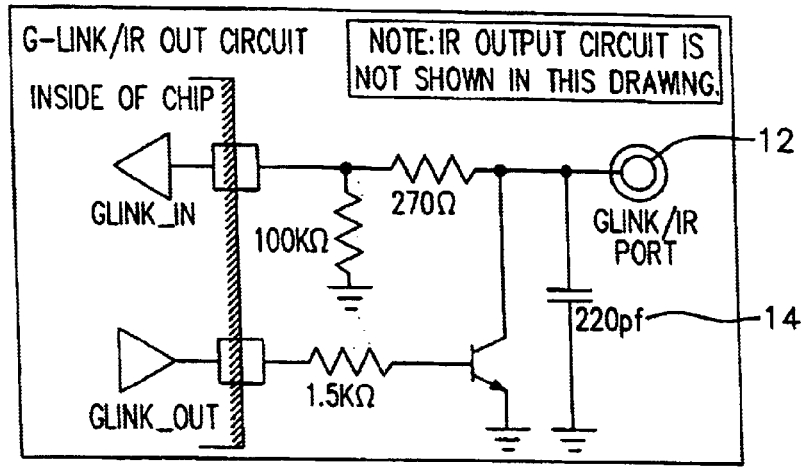
FIG. 3 is a schematic of the G-Link/IR Out circuit located in a TV/STB according to an embodiment of the invention.

FIG. 3 shows the G-Link/IR Out circuit generally located in the TV/STB. Electrically, the G-Link interface operates at CMOS logic levels. The output stage is an open collector, with a pull-up resistance of approximately 5K ohms. This port is commonly shared with the IR output port 12 of an EPG system. The G-Link input pin of the ASIC has CMOS logic thresholds.

Tables 1 through 3 show the DC characteristics for G-Link in the preferred embodiment of the invention. Table 1 shows the absolute maximum input voltage at the connector. Tables 2 and 3 assume Vdd=5.00V. Table 2 shows the valid logic input levels. Table 3 shows the output voltage at the connector.

TABLE 1

| Logic Value | Condition | Min (V) | Max (V) |
| --- | --- | --- | --- |
| Any | CMOS | Vss−0.3 | Vdd+0.3 |

TABLE 2

| Logic Value | Condition | Min (V) | Max (V) |
| --- | --- | --- | --- |
| Zero | CMOS |  | 1.5 |
| One | CMOS | 3.5 |  |

TABLE 3

| Logic Value | Condition | Min (V) | Max (V) |
| --- | --- | --- | --- |
| Zero | $I_{OL} = -10$ mA |  | 0.4 |
| One | $I_{OH} = 0.1$ mA | 4.0 |  |

For electrostatic discharge (ESD) protection and noise filtering, the rise time of the G-Link signal should not exceed 5 μS. Since the total pull-up resistance is about 5K ohms, in some configurations this allows for 220 pF of filter capacitance 14 to ground at each end of the G-Link wire. The series resistance of the G-Link cable connection should remain below 50 ohms.

The 270 ohm resistor 20, shown in FIG. 3, protects the ASIC from Electrostatic discharge (ESD). The 220 pF capacitor also helps protect the ASIC. Typically, a spark gap or other device is also added to satisfy manufacturer ESD standards.

In the preferred embodiment, the ASIC input pins can withstand the following ESD tests: 200 V from a 200 pF capacitor with no series resistance; and 1.0K V from a 100 pF capacitor with a 1.5K series resistance.

The G-Link and the IR output device share the same port. The IR output circuit, which typically shares the same connector with the G-Link port, consists of a high-side driver transistor. This transistor pulls the output up to Vcc through a current limiting resistor—the value of which depends on the particular IR output device. The IR and G-Link outputs can never be asserted at the same time.

Figure 4:
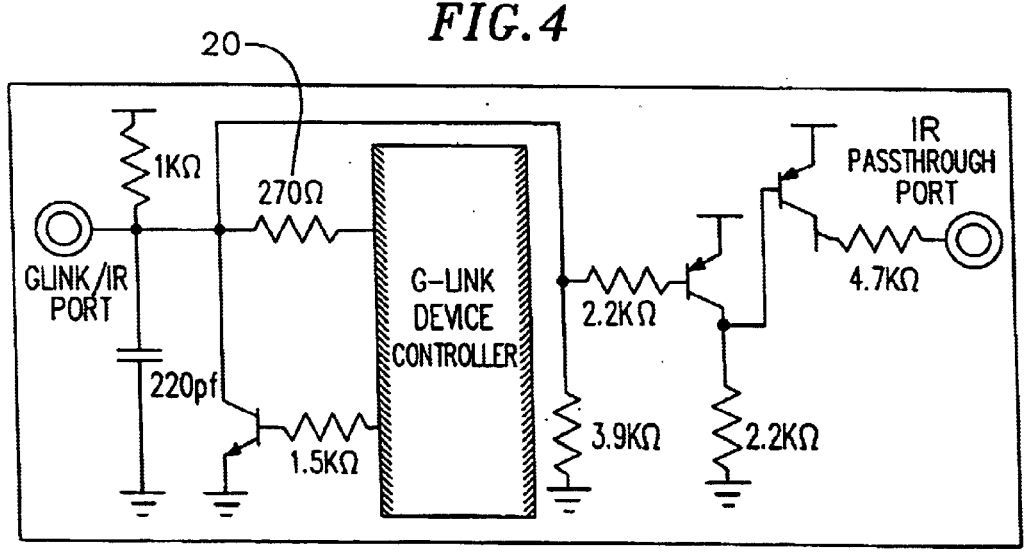
FIG. 4 is a schematic of the interface circuit of a G-link slave device according to an embodiment of the invention.

G-Link devices may take a variety of forms. A G-Link slave device can be powered by a separate external power source. A low-power G-Link slave device can be without an external power source. FIG. 4 shows the minimum required interface components for a G-Link device in a preferred embodiment of the invention.

In the preferred embodiment, the G-link hardware transmits asynchronously at 38400 bps using RS-232-type start and stop bits. Characters are transmitted with 8 data bits, no parity, and 1 stop bit (8N1). In alternative embodiments, the G-link hardware transmits at higher bps rates and may encode characters in any encoding scheme known to one with ordinary skill in the art.

The G-link follows the International Standards Organization Open Systems Interconnection (ISO/OSI) model for networks. The Transport layer in the Open Systems Interconnection (OSI) model resides between the Network and Session layers. The Transport layer controls the sequence of packets, regulates packet flow, and recognizes duplicate packets.

An error in a packet is indicated by a negative acknowledgment (NACK). If an error occurs in a packet (NACK), the Session layer must initiate a retransmission request.

Table 4 and Table 5 defines the general formats for all Request and Response packets in a preferred embodiment of the invention. Table 4 defines the Request Packet Format in a preferred embodiment. Table 5 defines the Response Packet Format in a preferred embodiment. In alternative embodiments, the Start-of-Packet (SOP) byte, Request Command byte, Data Block Length Byte, Sequence Low/ Sequence High, and Data Block within may occur in any order, except that the Data Block Length must be before the Data Block. EOP is End-of-Packet.

TABLE 4

| Byte Number | Meaning |
| --- | --- |
| 0 | SOP byte - 0x07 |
| 1 | Request Command Byte |
| 2 | Data Block Length Byte (number of payload bytes to follow, including EOP and Checksum; number of data bytes may be zero) |

TABLE 4-continued

| Byte Number | Meaning |
| --- | --- |
| 3–4 | Sequence Low/Sequence High. These bytes are included only if D5 of the Packet Type is set. These bytes are not included in the data block length count. |
| 5–N | Data Block (this block may contain zero bytes) |
| (last − 1) | EOP byte - 0x8F |
| (last) | Checksum (Zero indicates checksum not calculated. A zero checksum is mapped onto 0xFF.). Checksum (calculated by adding all bytes and checksum mod256 = 0) includes all bytes above, from SOP through EOP. |

TABLE 5

| Byte Number | Meaning |
| --- | --- |
| 0 | SOP byte - 0x07 |
| 1 | Response Command Byte |
| 2 | Data Block Length Byte (number of payload bytes to follow, including EOP and Checksum; number of data bytes may be zero) |
| 3–4 | Sequence Low/Sequence High. These bytes are included only if D5 of the Packet Type is set. These bytes are not included in the data block length count. |
| 5–N | Data Block (this block may contain zero bytes) |
| (last − 1) | EOP byte 0x8F |
| (last) | Checksum (Zero indicates checksum not calculated. A zero checksum is mapped onto 0xFF.). Checksum (calculated by adding all bytes and checksum mod256 = 0) includes all bytes above, from SOP through EOP. |

Every G-Link data transaction is a request/response packet sequence between the master and the slave. In most cases, the master initiates G-Link transactions (that is, the EPG device) that are acted upon by the slave (that is, the external device). A slave device must process, at a minimum, eight bytes of transmit and receive buffer data. There are three reasons for using this transaction method: (1) eases the implementation over a dual-simplex data link; (2) reduces the chance of data request collisions; and (3) eliminates potential problems when IR and G-Link share the same port-slave transactions respond with a Negative Acknowledgment (NACK) bit or interfere with IR operation.

A request/response packet sequence may be either a write request (where data is carried in the request) or read request (where data is contained in the corresponding response).

All valid request packets return an Acknowledge (ACK) response packet to the requester. When the transport layer of the responding device detects an error condition (for example, no valid SOP/EOP, invalid checksum, time-out, invalid command), a NACK response packet is returned to the requester.

In the event of a NACK response, the transport layer will not initiate a retry. The Session layer that resides on top of the transport layer is responsible for initiating a retry packet request. Either the master or slave can execute the packet retry.

In the preferred embodiment of the invention, a data block can be a maximum of 255 bytes. When a transaction has more data than can fit into one 255-byte data block, that data must be divided into a sequence of packets. Packet sequence numbers start at zero and monotonically increase as necessary. Data transfer must occur in order if the data block sizes within a packet are different sizes.

Although the transport layer controls the order of the packets, the request and response packets must include a Sequence Present bit and the packet sequence numbers.

In alternative embodiments of the invention, a data block can be greater than 255 bytes. Alternative embodiments can have data blocks that have a maximum of $2^n-1$ bytes, where n>8.

Table 6 lists the standard G-Link device commands supported by all G-Link devices.

TABLE 6

| Write Request | Command | Read Request | Command |
| --- | --- | --- | --- |
| Probe | 0x80 | Probe | 0x40 |
| Memory | 0x47 | Memory | 0x48 |
| Identify | 0x41 | Identify | 0x01 |

The G-Link probe process involves G-Link master device routinely sending a Probe Request packet that looks for the presence of a G-Link slave device. If a device is present, the slave sends a Probe Response packet.

Figure 5:
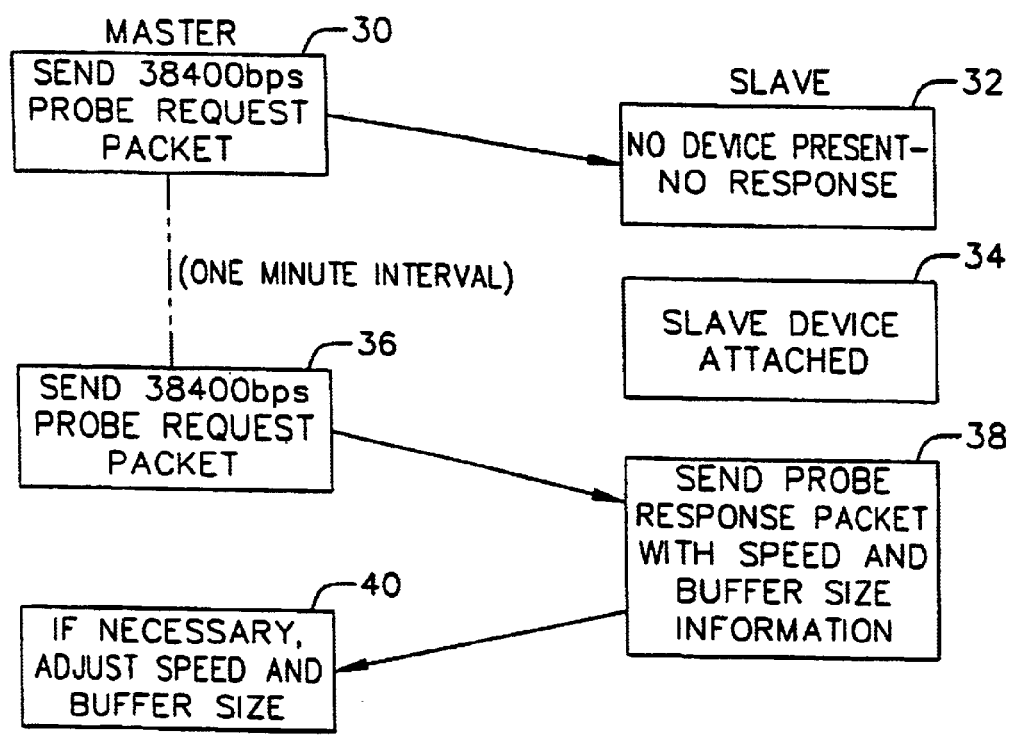
FIG. 5 is a flow diagram of the probe request/response process according to an embodiment of the invention.

FIG. 5 shows the probe request/response process. In the preferred embodiment of the invention, the Master sends a probe request packet every minute 30 until a probe response packet is sent by the slave. If there is no slave device present, then there will be no response 32. If a slave device is attached 34 and if it is operable, then it will send a Probe Response packet 38 in response to a Probe Request packet 36. The Probe Response packet includes speed and buffer size information. After receiving the Probe Response packet, the Master will adjust the speed and buffer size if the slave speed and buffer size information is different from the speed and buffer size information that the Master has 40.

Once a Probe Request and Response packet exchange has occurred between the master and slave, the master no longer sends a Probe Request packet—unless the slave does not respond to any other request-packet type, in which case the master re-initiates the Probe Request sequence.

In the preferred embodiment, the G-Link master supports only one slave device connection at a time. In alternate embodiments, the G-Link master may support more than one slave device, wherein a priority scheme is implemented to determine which device shall have access to the G-Link.

Link speed and buffer size are determined through the exchange of the Probe Request and Probe Response packets. The G-Link master sends a Probe Request packet with a default speed of 38400 bps and a buffer size of 255 bytes. The slave responds with a Probe Response packet defining its maximum transmission speed and buffer size. Table 7 lists the Probe Request packet format and Table 8 lists the Probe Response packet format.

TABLE 7

| Byte Number | Meaning |
| --- | --- |
| 0 | 0x80 |

TABLE 8

| Byte Number | Meaning |
| --- | --- |
| 0 | SOP byte - 0x07 |
| 1 | 0x40 |
| 2 | Data Block Length Byte - 0x04 |
| 3 | Baud Rate |
|   | D7-D2: Reserved |
|   | [D1:D0] |
|   | 00  4800 |
|   | 01  9600 |
|   | 10  19200 |
|   | 11  38400 |

TABLE 8-continued

| Byte Number | Meaning |
| --- | --- |
| 4 | Maximum Receive Buffer Size - 0x8 to 0xFF |
| 5 | EOP byte - 0x8F |
| 6 | Checksum |

Figure 6:
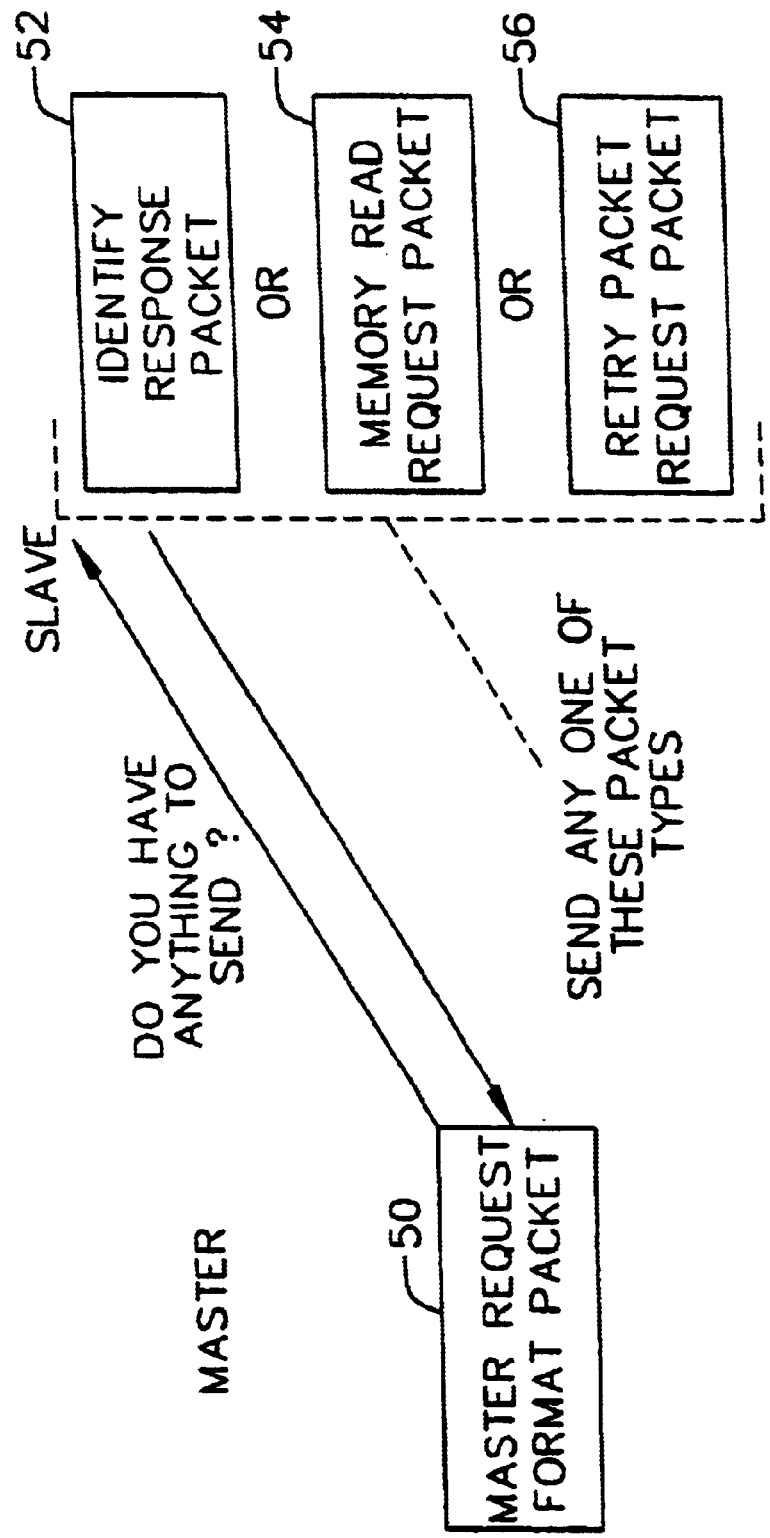
FIG. 6 is a diagram showing different packet types of packets transmitted between a slave and a master according to an embodiment of the invention.

The Master Request Format packet 50 is a generic request packet where the master asks the slave "do you have anything to send?" The advantage of this packet type is it allows the slave to respond without waiting for the master to send a specific request packet type (for example, the slave would only send an Identify Response packet after it received an Identify Request packet). FIG. 6 shows the different types of packets a slave could send in response to the Master Request Format packet. A slave device will still respond to a specific request packet type (that is, the slave sends an Identify Response packet after the master sends an Identify Request packet).

The slave can respond to a Master Request Format Packet with an Identify Response packet 52, a memory read followed by a Request packet 54, or a Retry packet followed by a Request packet 56.

The Identify Request and Identify Response packets are used to identify the slave device type. The Identification Response packet, as shown in Table 10, contains the following data: a device type/subtype and a null-terminated string describing the device. The device type/subtype data may be used by operational firmware to discern what slave device is installed on G-Link. The null-terminated string may be used by Factory Test/Diagnostics screens. Table 9 lists the Identification Request Packet format and Table 10 lists the Identification Response Packet format.

TABLE 9

| Byte Number | Meaning |
| --- | --- |
| 0 | SOP byte - 0x07 |
| 1 | 0x41 |
| 2 | Data Block Length Byte (0x02 = no data block present) |
| 3 | EOP byte - 0x8F |
| 4 | Checksum |

TABLE 10

| Byte Number | Meaning |
| --- | --- |
| 0 | SOP byte - 0x07 |
| 1 | 0x01 |
| 2 | Data Block Length - 0x02 |
| 3 | EOP byte - 0x8F |
| 4 | Checksum |

TABLE 11

| Byte Number | Meaning |
| --- | --- |
| 0 | SOP byte - 0x07 |
| 1 | Packet Type/Flag Byte |
|   | D7:b'1' - Request Packet |
|   | D6:b'0' - Read Request |
|   | D5:b'1' - Sequence field present |
|   | D4-D0: 0b00010: Load Driver Command |
| 2 | Data Block Length Byte |
| 3 | EOP byte - 0x8F |
| 4 | Checksum |

TABLE 12

| Byte Number | Meaning |
|---|---|
| 0 | SOP byte - 0x07 |
| 1 | 0x48 |
| 2 | Data Block Length Byte - 0x02 |
| 3–5 | Source Address (Preferred: Big Endian) |
| 6 | NUMBYTESTOREAD |
| 7 | EOP byte - 0x8F |
| 8 | Checksum |

Memory Write Packet Format

The Memory Write Request packet is a request-only packet initiated by the slave. This packet tells the master where and how much data the slave wants to store in the master. The master does not send a response packet. Table 13 lists the Memory Write Request Packet format.

TABLE 13

| Byte Number | Meaning |
|---|---|
| 0 | SOP byte - 0x07 |
| 1 | 0x47 |
| 2 | Data Block Length Byte - 0x02 |
| 3–5 | Source Address (Big Endian) |
| 6 | NUMBYTESTOWRITE |
| 7–N | Write Data Block |
| (last − 1) | EOP byte - 0x8F |
| (last) | Checksum |

The G-Link has state conditions for packets. Different packet types operate in various states. A packet type may be used in one or more of the following three states: Initial (Init), Communication (Comm), and Driver. In the Initial state probe packets are passed. In the Communication state, data, get next, and retry packets are passed. In the Driver state, driver packets are passed.

The type of packet sent in a state depends on which Master and Slave events are used. Master events are originated from the Slave. Slave events are originated from the Master. Master and Slave events and their corresponding designations are listed in Table 14.

TABLE 14

| Master Event Designation | Event Name | Slave Event Designation | Event Name |
|---|---|---|---|
| A | Other | i | Other |
| B | Timeout Probe | ii | Initial Probe |
| C | Probe Response | iii | Get Next |
| D | Request Read | iv | Timeout |
| E | Request Write | v | Factory Test Request |
| F | Load Driver | vi | Retry |
| G | Execute | vii | Miss Byte |
| H | IR Received | | |
| I | Factory Test Response | | |
| J | Miss Byte | | |
| K | Reset Protocol | | |
| L | Timeout Data | | |

Not all master events are allowed in every state. Table 15 indicates (using a •) which Master events are allowed in each state.

TABLE 15

| | A | B | C | D | E | F | G | H | I | J | K | L |
|---|---|---|---|---|---|---|---|---|---|---|---|---|
| Init State | • | • | | | | | | | | | | |
| Comm State | • | | • | • | • | • | • | • | • | • | • | • |
| Driver State | • | • | • | • | | | | | | | • | • |

Figure 7:
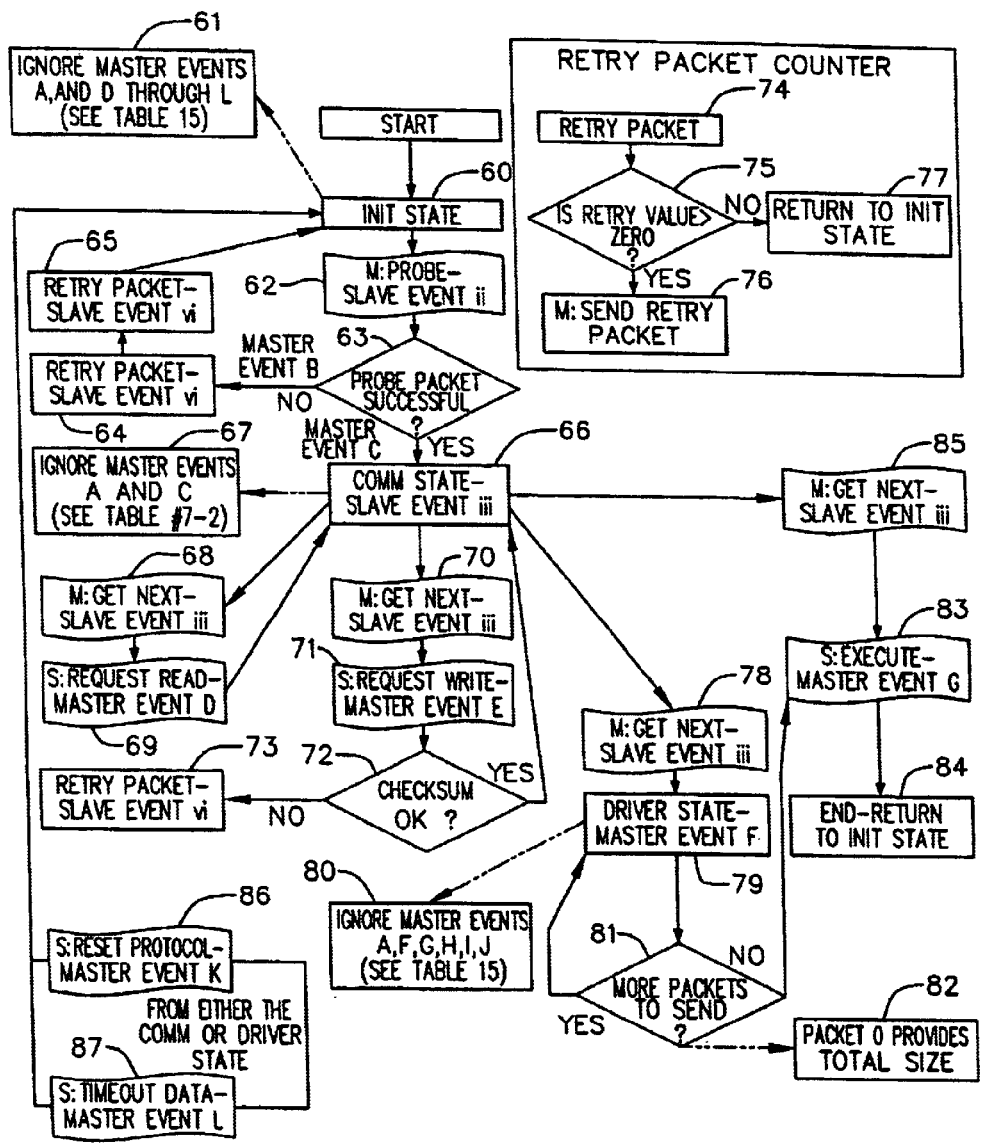
FIG. 7 is a flow diagram of showing the interaction of Init, Comm and Driver states according to an embodiment of the invention.

FIG. 7 shows an example of how packets and events interact in the three states. In the Initial state probe packets are passed. In the Communication state, data, get next, and retry packets are passed. In the Driver state, driver packets are passed.

In the initial state 60, the slave device ignores Master events A, and D through L as shown in Table 15 61. The Master does an initial probe of the slave 62. If the slave responds to the initial probe, then the probe packet was successful and the Communication State is entered 63. If the probe packet is not successful, then the Master sends a timeout probe to the slave and the slave has a timeout 64. Then, the Master sends a retry packet to the slave and the slave does a retry 65. The slave attempts to respond to the retry packet, whereupon the initial state 60 is entered and the Master does another initial probe of the slave 62.

In the Communication State, the slave formats the next packet to give to the Master 66. In the Communication State, the slave ignores Master events A (Other) and C (Probe Response) 67.

There are four paths that the Communication State can take. In one path, the Master requests the next packet from the slave 68. Then, the slave does a request read and the master responds with the data from the specified address.

In a second path, the Master requests the next packet from the slave 70. The slave writes the packet 71. There is just one "next packet request" instead of both a "next packet request" and a "master request for a write." A checksum is checked to see if it is valid 72. If the checksum is not valid, then there is a retry of a packet write from the slave to the Master and the slave attempts a retry 73. Another possibility is that one or more bytes are missed by the slave and the master times out waiting for the expected number of bytes to be received. In this case, the slave also times out.

When there is a retry of a packet 74, a retry packet counter is checked 75. If the retry packet counter is greater than zero, then the master sends a retry packet to the slave 76. If the retry packet counter is not greater than zero, then the Initial state is returned to 77. The "Initial State" is a cold reset of the Master. At this point, the Master assumes that the slave has hung up in the middle of uploading a patch, and the Master attempts to purge its memory with this Cold Reset.

In a third path, the Master requests the next packet from the slave 78. The Driver State is entered 79 and Master events A, F, G, H, I, and J are ignored 80. The Master begins to load the driver from the slave, packet by packet. A test is conducted for whether there are more packets 81. Just in case the same packet is sent twice correctly by the slave, the master counts it as only one packet received. Packet zero provides the total size 82. If there are more packets to be sent, then the slave continues to send packets to the Master. If there are no more packets to be sent, then the slave sends an execute packet and the Master executes the sent packets 83 whereupon the Initial state is returned to 84.

In a fourth path, the Master requests the next packet from the slave 85. The slave sends an execute packet and the Master executes the packet 83 whereupon the Initial state is returned to 84.

From either the Communication State or the Driver State, the slave can Reset Protocol in which case the Master resets the protocol 86 or the slave can timeout, in which case the Master has a Factory Test Response 87.

A patch download from a slave device to a TV/STB comprises three stages. The three stages in the bootstrap process are (1) Initial Bootstrap; (2) Final Bootstrap; and (3) Patch Load. Each stage provides items that are used in the next stage. The preceding stage must be successfully completed before the next one can begin.

Figure 8:
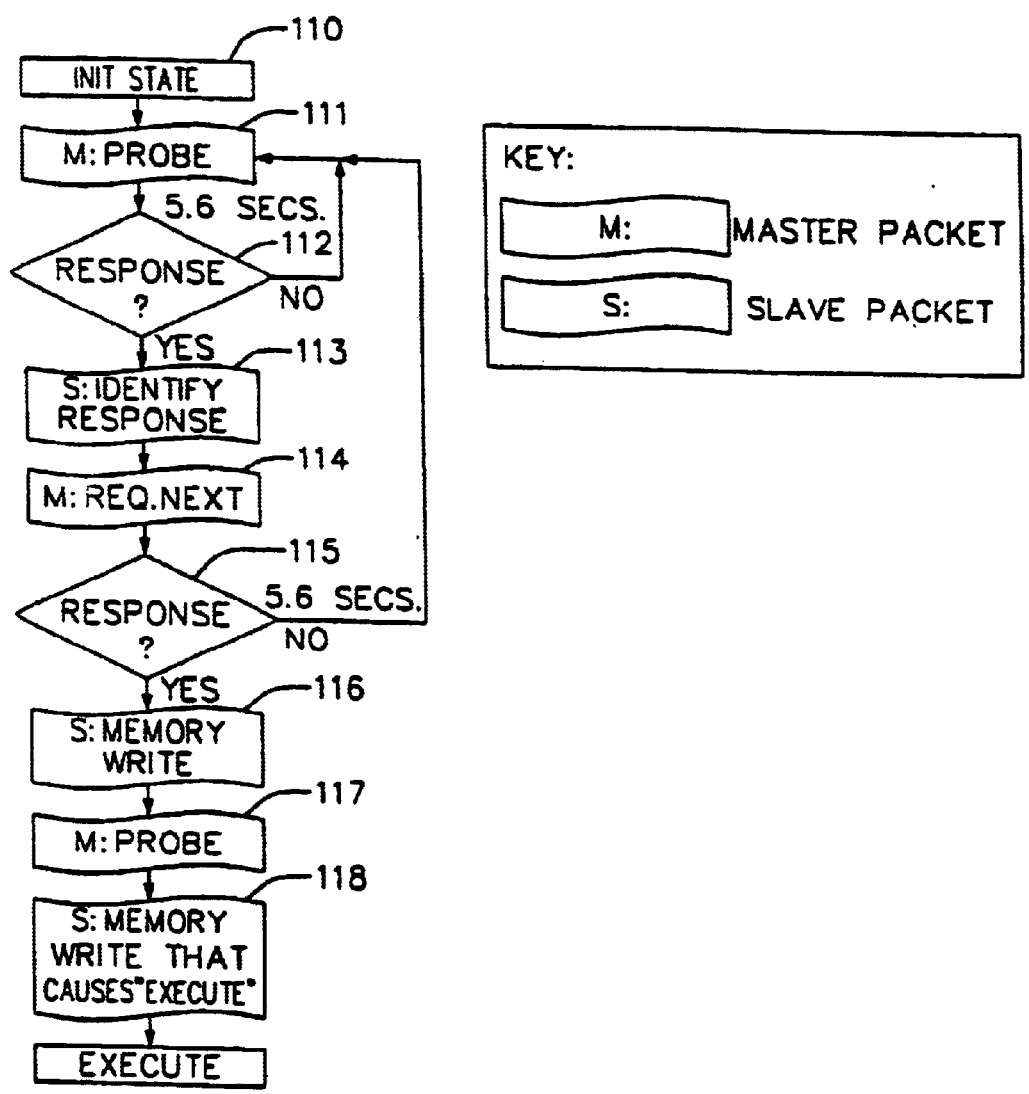
FIG. 8 is a flow diagram of a initial bootstrap stage according to an embodiment of the invention.

Stage 1 is the Initial Bootstrap stage. The Initial Bootstrap stage provides the essential tools used in the Stage 2, Final Bootstrap stage. FIG. 8 shows the initial bootstrap stage. After the successful completion of the initial bootstrap stage, the following items are available for use in the next stage: Faster probe packets (every 0.5 seconds), Watchdog timer, and End of stage packet handler.

At the beginning of the initial bootstrap stage, the Slave device is in its initial state 110. The TV/STB, which is a G-link master device, routinely sends to the slave device, a probe request packet 111 that looks for the presence of a G-link slave device. In a preferred embodiment of the invention, if the TV/STB determines within 5.6 seconds 112 that the slave device is present, then the slave device sends an identify response packet 113. The TV/STB requests the next packet from the slave device 114. In a preferred embodiment of the invention, if the slave device responds within 5.6 seconds to the next packet request 115, then the slave device does a memory write to its memory 116. The TV/STB sends another probe request packet to the slave device 117. The slave device does a memory write to the TV/STB that causes the TV/STB to "execute" the instructions within the memory write 118. The TV/STB executes the instructions contained within the memory write from the slave device 119.

Figure 9:
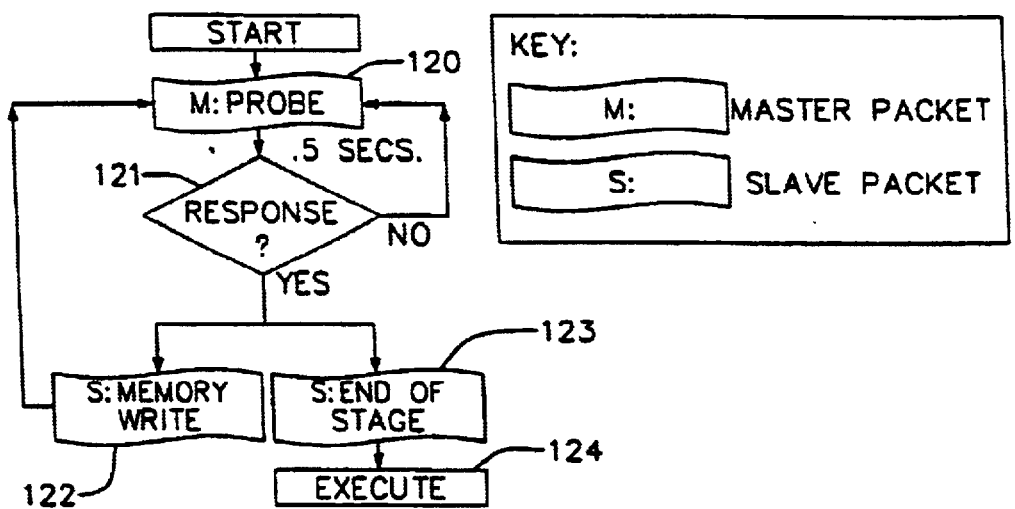
FIG. 9 is a flow diagram of a final bootstrap process according to an embodiment of the invention.

Stage 2 is the Final Bootstrap stage. FIG. 9 shows the Final Bootstrap process. The final bootstrap stage provides the patch information that is loaded in the third stage. After the successful completion of the Final Bootstrap stage, at least the following items are available:

TV screen display that shows real-time download percent complete, watchdog timer (replaces watchdog timer from stage 1);

Get Next packet (suppresses Probe packets from stage 1);

End of stage packet handler (replaces End of stage packet from stage 1);

Retry packet; and size of a final patch.

At the beginning of the final bootstrap stage, the TV/STB sends a probe request packet to the slave device 120. In a preferred embodiment of the invention, the TV/STB determines within 0.5 seconds whether the slave device has responded to the TV/STB 121. If the slave device does respond within 0.5 seconds, then the slave device does a memory write 122 until the end of the final bootstrap stage 123. At the end of the final bootstrap stage, the instruction within the memory-writes are executed by the TV/STB 124.

Figure 10:
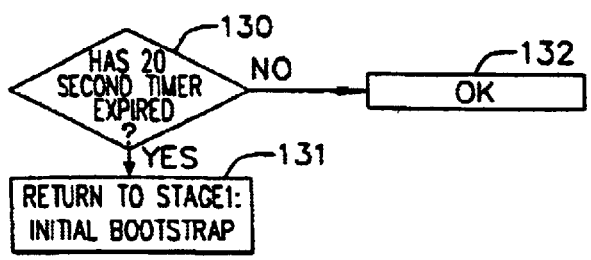
FIG. 10 is a flow diagram of a bootstrap timer process according to an embodiment of the invention.

FIG. 10 shows the 20-second timer flowchart, which is applicable in a preferred embodiment of the invention. During the final bootstrap stage, if a 20-second timer expires 130, then the bootstrap process returns to the initial bootstrap stage 131, otherwise the bootstrap process is proceeding properly 132.

Figure 11:
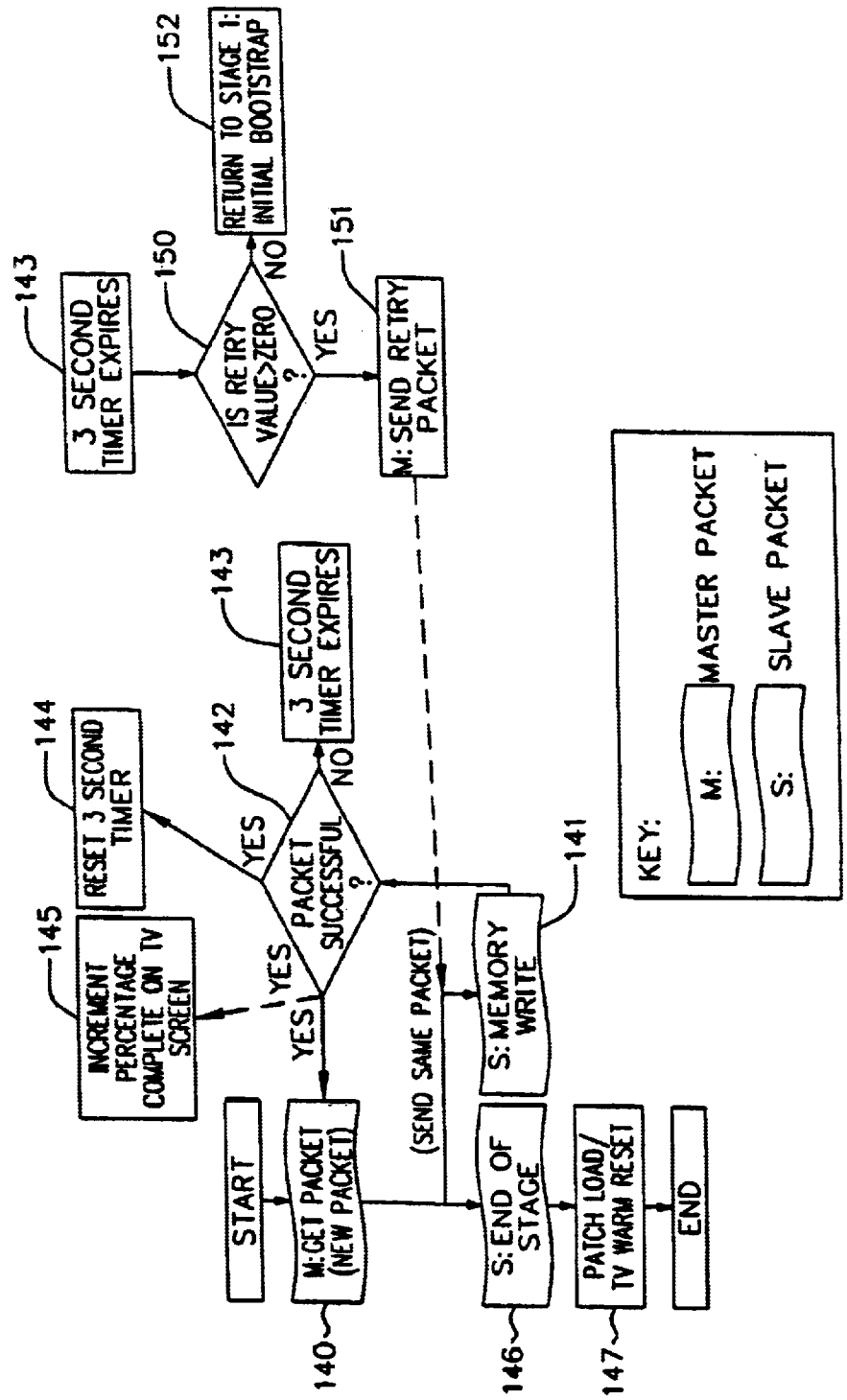
FIG. 11 is a flow diagram of a patch load stage according to an embodiment of the invention.

Stage 3 is the Patch Load stage. FIG. 11 shows the patch load stage. The patch load stage arranges the information from the first two stages into usable patch code. At the beginning of the patch load stage, the TV/STB gets a new packet from the slave device 140. The slave device does a memory write from its memory to the TV/STB 141. The TV/STB determines whether the packet has been successfully received by the TV/STB within a timer period 142. In the preferred embodiment of the invention, the timer period is three seconds. If the timer period expires 143, then the packet was not successfully transferred from the slave device to the TV/STB. If the packet is determined to be successfully received, then the timer period is reset 144, the displayed percentage completed on the television screen is incremented 145, and the TV/STB gets the next packet from the slave device 140. When the patch load end of stage is reached 146, the TV/STB goes into a patch load warm reset state. When the timer period expires 143, then the TV/STB determines whether a retry counter is greater than zero 150. The retry counter represents the number of times the TV/STB will retry a packet request because of the timer period expiration. If the retry counter is greater than zero, then the TV/STB will request another packet from the slave device 151. If the retry counter is not greater than zero, then the retry counter has been exhausted and the bootstrap process returns to stage 1, the Initial Bootstrap stage 152.

What is claimed is:

1. A consumer electronic device interface for use with a consumer electronic device comprising:

a first combined serial and infrared port included with the consumer electronic device configured as a master, wherein a first serial signal and a first infrared signal share a first signal wire at the first port; and a slave peripheral device comprising a second combined serial and infrared port configured as a slave and capable of communicating with the first combined serial and infrared port, wherein a second serial signal and a second infrared signal share a second signal wire at the second port; and an infrared transmitter port capable of sending signal to an infrared transmitter.

2. The interface of claim 1 wherein the slave peripheral device comprises a serial debugger.

3. The interface of claim 1 wherein the slave peripheral device comprises a demonstration ROM device.

4. The interface of claim 1 wherein the slave peripheral device comprises a database expansion device.

5. The interface of claim 1 wherein the slave peripheral device comprises a modem.

6. The interface of claim 2 wherein software patches are downloaded into the consumer electronic device from the slave peripheral device.

7. The interface of claim 1 wherein the consumer electronic device is a television.

8. The interface of claim 1 wherein the consumer electronic device is a video recorder.

9. The interface of claim 1 wherein the consumer electronic device is a television set top box.

10. The interface of claim 1 wherein the consumer electronic device is a satellite receiver.

11. The interface of claim 1 wherein the consumer electronic device is a cable box.

12. The interface of claim 1 wherein a demonstration interactive electronic program guide is downloaded from the slave peripheral device to the consumer electronic device.

* * * * *